United States Patent [19]

Bills

[11] 3,901,869

[45] Aug. 26, 1975

[54] ACIDIFICATION OF TALL OIL SOAP

[75] Inventor: Alan M. Bills, Summerville, S.C.

[73] Assignee: Westvaco Corporation, New York, N.Y.

[22] Filed: Jan. 11, 1974

[21] Appl. No.: 432,561

[52] U.S. Cl. .............................. 260/97.5; 260/97.6
[51] Int. Cl.² ............................................ C09F 1/00
[58] Field of Search .......... 260/97.5, 97.6, 104, 106

[56] References Cited
UNITED STATES PATENTS

| | | | |
|---|---|---|---|
| 1,820,265 | 8/1931 | Bent | 260/104 |
| 1,888,581 | 11/1932 | Bent | 260/97.6 |
| 2,228,976 | 1/1941 | Reboulet | 260/124 |
| 2,396,646 | 3/1946 | Dressler | 260/97.6 |
| 2,503,268 | 4/1950 | Hasselstrom | 260/106 |

*Primary Examiner*—Donald E. Czaja
*Assistant Examiner*—William E. Parker
*Attorney, Agent, or Firm*—Richard L. Schmalz; Ernest B. Lipscomb, III

[57] ABSTRACT

There is disclosed a process for the recovery of fatty acids and rosin acids from tall oil soap by acidification of the tall oil soap with from three-fourths part to 2 parts of water per part of tall oil soap with carbon dioxide at a temperature between ambient and 120°F. This reaction proceeds to at least 40% in one hour with thorough mixing. The remaining tall oil soap may then, if desired, after separation from the bicarbonate-brine layer be further acidified with sulfuric acid or recycled for further carbonation to recover the remaining tall oil soap as crude tall oil.

8 Claims, No Drawings

ACIDIFICATION OF TALL OIL SOAP

BACKGROUND OF THE INVENTION

1. Field of the Invention

This invention relates to an improved process for recovering crude tall oil from tall oil soaps. More particularly, this invention relates to a process for partially acidifying tall oil soaps with carbon dioxide.

2. The Prior Art

Tall oil is obtained from the black liquor of the alkaline digestion of coniferous wood, most notably the kraft process. The black liquor is concentrated and allowed to settle, the tall oil soap-containing portion at pH about 12 rises to the top layer, and is skimmed off. The black liquor soap skimmings recovered from the kraft process are reacted with a strong polar acid, usually sulfuric acid, to reduce the pH to about 3.5, and thereby separate the crude tall oil as shown in the following reaction to free rosin and fatty acids.

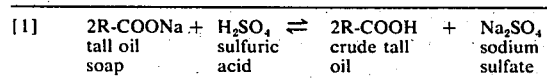

[1] 2R-COONa + H₂SO₄ ⇌ 2R-COOH + Na₂SO₄
    tall oil    sulfuric    crude tall    sodium
    soap       acid         oil           sulfate Upon acidification of the tall oil soaps, the reaction mixture is allowed to settle and forms two layers — a crude tall oil layer and a sulfate-brine layer. The sulfate-brine layer is returned to the pulp mill to recover the chemicals for use in the kraft pulping process. The crude tall oil is washed with hot water and allowed to settle. The crude tall oil is drawn off and placed in storage. The yield of crude tall oil varies somewhat depending upon the source of wood and the details of its processing, but the national average indicates a recovery of about 1% based on the weight of wood pulped. The crude tall oil is then fractionally distilled to obtain approximately equal portions of rosin acids and fatty acids and to remove the greater portion of the odor and color-forming constituents. However, in this day of ecological problems, many pulp mills have been forced to eliminate effluent streams containing sulfur compounds; and thus, the return of the sulfate-brine layer to the pulp mill causes an intolerable build up of sulfur-containing chemicals in the pulp mill. Therefore, it has become necessary in tall oil refineries related to paper mills to eliminate or substantially lessen the return of sulfates to the paper mill.

As stated, commercially recovered tall oil is acidified using sulfuric acid and numerous attempts to acidify with other acids have been attempted. To liberate completely the crude tall oil from the soap, it has been necessary to acidify by lowering the pH to about 3 which requires a strong acid. Therefore, attempts to use other acids, such as carbonic acid or $CO_2$ or a gas stream containing $CO_2$, have met with only partial success because of the inability to reach the lower pH range.

However, Bent in U.S. Pat. No. 1,888,581 teaches a process for recovering rosin from rosin-containing soap produced in the manufacture of paper pulp from wood. The rosin soap was dissolved in a large amount of water to form a very dilute soap solution. The amount of water depended upon the character of the soap, but in any case, the soap equaled less than 10% by weight of the total solution. A large excess of carbon dioxide was bubbled through the solution for about 4 hours to completely precipitate the rosin. Bent, who is intent on recovering rosin acids only and not including fatty acids, failed to realize the significance of maintaining the reaction temperature below 120°F., did not use a concentrated soap solution, used a large excess of $CO_2$ and further did not make a complete conversion of rosin soaps to free acids.

Bergstrom et al. in Swedish Pat. Nos. 98,166 and 103,629 attempted to liberate a liquid-resin product from soft soap from the soda cellulose process with carbonic acid. However, at the high initial pH, e.g., about 12, Bergstrom et al. state (Swedish Pat. No. 103,629) that no significant carbonic acid is absorbed and thus no noteworthy precipitation was obtained. Bergstrom thus teaches lowering the pH to about 10 with another material of lower pH before acidifying with a carbon dioxide-containing gas.

It is thus the general object of this invention to provide a process for recovering crude tall oil from tall oil soaps.

Another object of this invention is to provide a process for the acidification of tall oil soaps with carbon dioxide to pH about 7–8.

Still another object of this invention is to provide a process for the partial acidification of tall oil soaps with carbon dioxide to a pH of 7–8 followed by further acidification to pH 3–4 with sulfuric acid.

An even further object of this invention is to provide a process where tall oil soaps are acidified to pH 7–8 with carbon dioxide, allowed to settle and the soap-acid layer recycled for further acidification in a multi-step operation.

Other objects, features, and advantages of this invention will be evident from the foregoing detailed description.

SUMMARY OF THE INVENTION

It has been found that acidification of a mixture of tall oil soap with three-fourth part to 2 parts of water per part of soap with carbon dioxide at room temperature and atmospheric pressure proceeds to the extent of 40% in less than 1 hour, if efficient mixing is maintained. It is essential that carbonation take place at a maximum temperature below 120°F. Additionally, the amount of water added to the tall oil soap must also be at least between 75% and 200% of the amount of soap present. The carbon dioxide used may be gaseous, liquid or solid and is preferably employed in about a stoichiometric amount of soap to be acidified. After acidification with carbon dioxide is complete using the proper conditions, the mixture is allowed to settle and the soap-acid layer at about pH 7–8 is separated from the bicarbonate-brine layer. The acid-soap layer may then be further acidified with sulfuric acid to pH 3–4 to complete the liberation of the fatty acids and rosin acids from the soap. Alternatively, the soap-acid layer may be recycled, an equivalent amount of fresh water added and acidified with carbon dioxide as in a multi-step process.

DETAILED DESCRIPTION OF THE INVENTION

In considering the acidification of tall oil soap with carbon dioxide, the following equation is operative:

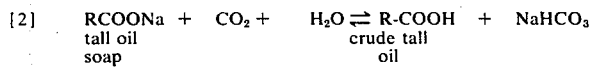

[2]   RCOONa + CO₂ + H₂O ⇌ R-COOH + NaHCO₃
      tall oil                crude tall
      soap                    oil This accounts for the neutralization of the sodium soaps of the fatty and rosin acids but does not account for the neutralization of excess sodium hydroxide (black liquor) and sodium lignates. These will require extra acid for neutralization.

The effect of temperature on the $CO_2$ acidification was determined by making batch acidifications at various temperatures at 40 p.s.i.g., and the results are shown hereinafter in the examples. It was found, however, that at both 120°F. and 160°F. the resulting acidified soap was a smooth emulsion which would not break. At 105°F. there was no emulsification, and there was a good break between the soap-acids and the bicarbonate brine. It is believed that, since above 120°F. sodium bicarbonate begins to decompose into sodium carbonate and carbon dioxide, the liberated acids tend to resaponify as the carbonate is formed, thereby preventing formation of sufficient acid to initiate the break between the soaps-acids and bicarbonate brine.

The amount of water added to the tall oil soaps is also an essential part of the subject invention. The soap to water ratio may vary from 75% to 200% of an equal part of water and soap. When less soap than a 3/4:1 (water:soap) ratio is used, the amount of precipitated tall oil acids is lessened. When the ratio proceeds below the 3/4:1 water to soap ratio, the viscosity of the mixture becomes too high, thus preventing it from separating into bicarbonate brine and soap-acid layers. When much more water than 2 parts water to 1 part soap is added, the increased amount of water makes the process less economically attractive due to increased evaporation costs causing the process to become more expensive.

The manner in which the carbon dioxide is contacted with the soap depends upon the form the carbon dioxide is in, for example, liquid, solid, gaseous or as carbonic acid. The carbon dioxide is added in at least a stoichiometric amount of soap. Only such excess carbon dioxide as is needed to neutralize excess sodium hydroxide and sodium lignates is recommended as further excess carbon dioxide is likely to cause foaming. When using liquid carbon dioxide, the theoretical amount of liquid carbon dioxide is added slowly to avoid flashing of the liquid through the gas before reaction occurs. The process proceeds satisfactorily at atmospheric pressure; however, to increase the rate of reaction, higher pressures may be employed, say 10 p.s.i. to 40 p.s.i. and higher, e.g., 150 p.s.i.

The general process for accomplishing the acidification of tall oil soap follows the following description; the proper amount of carbon dioxide is added to a water:soap (1.6:1) solution at room temperature with vigorous mixing in a kettle until homogeneous, e.g., 15 minutes. The resulting mixture is allowed to settle and separates well into a bicarbonate-brine and a soap-acid layer. The reaction is essentially complete in 4 minutes. Under the most favorable conditions, the maximum reduction in sulfuric acid use is about 60%.

As stated, the maximum reduction in sulfuric acid use is about 60% which means that a substantial portion of the tall oil soaps remain unacidified. The subject process contemplates the complete reduction to a completely acidified tall oil soap by one of two methods.

The subsequent completion of the acidification of the soap-acid layer from the $CO_2$ acidification may be accomplished by a second stage wherein 96% sulfuric acid is used to further reduce the pH to between 3 and 4. However, it is necessary to strip out any excess brine prior to the second stage in order to prevent entrained bicarbonate brine in the soap-acids from reacting with sulfuric acid and thus liberating carbon dioxide causing considerable foaming. The stripping step may be accomplished by a simple washing of the soap-acids layer or by using steam stripping. Steam stripping of the soap-acid layer would remove any excess dissolved $CO_2$ from the mixture.

Another alternative for accomplishing successful $CO_2$ acidification of tall oil soaps is in the use of a staging process, wherein the first stage is carried out as described hereinabove; and the soaps-acid layer that has been previously carbonated is recarbonated with an equivalent portion of fresh water. The resulting soap-acids require only about 35% as much sulfuric acid to complete the acidification as was required by a comparable acidification using all sulfuric acid. The only difficulty with using successive staging operation is an increase in the use of water which would add greatly to the evaporation load.

The advantages of this invention lie primarily in the ecological benefits obtained by reducing the use of sulfuric acid in the process, either through elimination of the use of sulfuric acid in a staging process or a substantial, i.e., approximately 40% to 60%, reduction in sulfuric acid using the partial acidification sequence.

The practice of this invention may be seen from the following examples.

EXAMPLE 1

All of the batch cooks were carried out either in a 10-gallon Pfaudler kettle reactor or a 7.5-gallon kettle reactor. The normal operating procedure was to charge the soap and water to the kettle, allow to mix until homogeneous (15 minutes), then to seal the reactor and introduce gaseous $CO_2$ through a steamsparge line in the bottom of the kettle, or, where indicated, place dry ice (solid $CO_2$) in the kettle. The cooks, which were run under pressure, were monitored by removing samples at intervals and determining the pH and rate of separation of soap-acid from the bicarbonate brine. When two successive samples showed no change in pH, the cook was terminated and was either removed from the reactor and allowed to settle in a 5-gallon can for at least one hour, or allowed to settle in the reactor. Percent solids were then determined on both the bicarbonate brine and soap-acid layers and a 1,000-gram sample of the soap layer was acidified with sulfuric acid to a pH of 3.5 to determine the extent of $CO_2$ acidification as compared with a blank. The blank consisted of 1,000 grams of untreated soap acidified with sulfuric acid to pH 3.5. The results and analyses for the batch runs are shown in Table I.

TABLE I

BATCH ACIDIFICATIONS UNDER VARIOUS CONDITIONS

| Test | | pH of CO$_2$ Stage | % NaHCO$_3$ in Bicarbonate Brine | % Yield of CTO | Lbs. H$_2$SO$_4$ per lbs. CTO | % Reduction in H$_2$SO$_4$ |
|---|---|---|---|---|---|---|
| 20 lbs. Soap<br>20 lbs. Water<br>59.0% Solids on Soap-Acids | 40 psig | 7.6 | 6.8 | 54.0 (54.5) | 0.150 (0.250) | 40 |
| 20 lbs. Soap<br>15 lbs. Water | 40 psi | 7.6 | 8.1 | — | — | 37.0* |
| 20 lbs. Soap<br>20 lbs. Water | 150 psi | 7.7 | 9.3 | 57.4 (54.2) | 0.0974 (.207) | 53 |
| 20 lbs. Soap<br>20 lbs. Water | 40 psi | 7.5 | 8.3 | 58.1 (54.2) | 0.112 (.207) | 46 |
| 10 lbs. Soap<br>16.24 lbs. Water<br>0.5 lb. CO$_2$ | Solid CO$_2$ Cook | 7.6 | 5.0 | — | — | 41* |
| 10 lbs. Soap<br>16.25 lbs. Water<br>1.0 lb. CO$_2$ | Solid CO$_2$ Cook | 7.6 | 5.8 | — | — | 47* |
| 20 lbs. Soap<br>32 lbs. Water | 150 psi | 7.6 | 6.5 | — | — | 55* |

Note: Data in parentheses refers to corresponding blank H$_2$SO$_4$ acidification.
*Calculated from NaHCO$_3$ concentration in the brine.

EXAMPLE 2

In the first continuous run, a soap-water mixture (439 number at 68% solids/439 number) was carefully mixed in the feed tank until homogeneous using the indicated agitator. This feed was then pumped through a flow meter (at 0.5 gallon/minute) into an eductor at which point 30 pounds CO$_2$ gas was introduced. The mixture was then pumped through a Moyno pump and out into a receiving tank. A pressure of 150–200 psi was allowed to buildup between the Moyno pump and the receiving tank by restricting the flow through the pressure control valve manually. The heat exchanger was by-passed in these runs giving a hold-up of 7 minutes. The other continuous runs were carried out in a similar way except that the Moyno pump was not used and the reactants were pumped through the heat exchanger giving a hold-up of about 27 minutes. The pressure on the hold-up system was maintained between 40 and 50 psi. The results and analyses for the batch runs are shown in Table II.

carbon dioxide. The carbonated soap, 18.25 pounds of soap-acids, were further acidified to pH 3.5 with 349.7 grams of concentrated sulfuric acid which yielded 3762 grams of crude tall oil.

In order to determine the reduction in sulfuric acid needed for acidification, a blank was run wherein 18 pounds of tall oil soap was acidified to pH 2.8 with 960 grams of concentrated sulfuric acid. By comparison this resulted in a reduction of 56% of sulfuric acid needed to obtain the equivalent amount of crude tall oil.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for acidification of tall oil soaps which comprises, acidifying tall oil soaps containing from 75% to 200% by weight of water per part of tall oil soaps with an amount of carbon dioxide sufficient to lower the pH to between 7 – 8 at a temperature from ambient to 120°F., allowing said acidified tall oil soap to settle into a soap-acid layer and a bicarbonate brine layer.

TABLE II

RESULTS FOR CONTINUOUS RUNS

| Test | | pH of CO$_2$ Stage | % Solids in Soap-Acids | % Solids in Bicarbonate Brine | % Yield of CTO | lbs. H$_2$SO$_4$ Per lbs. CTO | % Reduction in H$_2$SO$_4$ |
|---|---|---|---|---|---|---|---|
| 439 lbs. Soap [68.0% Solids]<br>439 lbs. Water | 40 psig | 7.6 | — | — | 51.6 (51.6) | 0.126 (0.210) | 40.0 |
| 200 lbs. Soap<br>210 lbs. Water | 150 psig | 7.5 | 61.8 | 7.5 | 44.0 (44.5) | 0.143 (0.250) | 43.0 |
| 200 lbs. Soap<br>210 lbs. Water | 150 psig | 7.5 | 59.3 | 7.4 | 44.0 (44.5) | 0.143 (0.250) | 43.0 |
| 200 lbs. Soap<br>200 lbs. Water | 40 psig | 7.6 | 59.4 | 5.8 | — | 0.138 (0.250) | 40.0 |

Note: Parenthetical numbers refer to corresponding blank H$_2$SO$_4$ acidification.

EXAMPLE 3

This example is to illustrate the use of carbonation of tall oil soap with liquid carbon dioxide. To a 7.5-gallon kettle reactor was charged 20 pounds of tall oil soap and 32 pounds of water. The soap-water mixture was agitated until homogeneous. To the homogeneous soap-water mixture was added 1.88 pounds of liquid 2. The process of claim 1 wherein said soap-acid layer is recycled.

3. The process of claim 1 wherein said carbon dioxide is a gas.

4. The process of claim 1 wherein said carbon dioxide is a liquid.

5. The process of claim 1 wherein said carbon dioxide is a solid.

6. The process of claim 1 wherein the reaction is carried out at a pressure from 10 p.s.i. to 150 p.s.i.

7. A process for acidification of tall oil soaps which comprises,
 a. acidifying tall oil soaps containing from 75% to 200% by weight of water per part of tall oil soap with an amount of carbon dioxide sufficient to lower the pH to between 7 and 8 at a temperature from ambient to 120°F.,
 b. allowing said acidified tall oil soap to settle into a soap-acid layer and a bicarbonate brine layer,
 c. separating said soap-acid layer from said bicarbonate brine layer, and
 d. acidifying said soap-acid layer to a pH between 3 and 4 with sulfuric acid.

8. The process of claim 7 wherein the acidification with carbon dioxide is carried out at a pressure from 10 p.s.i. to 150 p.s.i.

* * * * *